US 6,737,583 B2

(12) United States Patent
Saeki et al.

(10) Patent No.: US 6,737,583 B2
(45) Date of Patent: May 18, 2004

(54) GROMMET AND METHOD OF PRODUCING THE SAME

(75) Inventors: Shinichi Saeki, Shizuoka (JP); Ikuo Takeda, Shizuoka (JP); Hiroaki Arai, Shizuoka (JP); Shuji Ono, Shizuoka (JP); Fusao Oosumi, Shizuoka (JP)

(73) Assignees: Yazaki Corporation, Tokyo (JP); Seien Gum Industrial Co., Ltd., Shizuoka (JP)

( * ) Notice: Subject to any disclaimer, the term of this patent is extended or adjusted under 35 U.S.C. 154(b) by 0 days.

(21) Appl. No.: 09/863,892

(22) Filed: May 24, 2001

(65) Prior Publication Data

US 2002/0004967 A1 Jan. 17, 2002

(30) Foreign Application Priority Data

May 25, 2000 (JP) ........................................ 2000-155238

(51) Int. Cl.⁷ ................................................ H02G 3/18
(52) U.S. Cl. ................................ 174/65 G; 174/152 G; 16/2.1; 248/56
(58) Field of Search ........................... 174/65 G, 65 SS, 174/65 R, 152 G, 153 G, 151, 135, 64, 153 R; 16/2.1, 2.2, 2.5; 248/56

(56) References Cited

U.S. PATENT DOCUMENTS

| 5,567,916 A | * | 10/1996 | Napiorkowski et al. | 174/65 G |
| 6,081,964 A | * | 7/2000 | Mori | 16/2.2 |
| 6,265,670 B1 | * | 7/2001 | Duesterhoeft et al. | 174/152 G |

FOREIGN PATENT DOCUMENTS

| JP | 5-23353 | 3/1993 |
| JP | 5-291780 | 11/1993 |
| JP | 6-34051 | 2/1994 |
| JP | 6-36604 | 2/1994 |
| JP | 6-43903 | 6/1994 |
| JP | 7-22143 | 1/1995 |
| JP | 7-215340 | 8/1995 |
| JP | 8-7685 | 1/1996 |
| JP | 408007685 A | * | 1/1996 |
| JP | 8-329758 | 12/1996 |
| JP | 9-117039 | 5/1997 |
| JP | 9-120728 | 5/1997 |
| JP | 9-240390 | 9/1997 |
| JP | 9-289725 | 11/1997 |
| JP | 9-322361 | 12/1997 |
| JP | 10-47548 | 2/1998 |
| JP | 10-145944 | 5/1998 |
| JP | 10-246333 | 9/1998 |
| JP | 11-41756 | 2/1999 |
| JP | 11-89053 | 3/1999 |
| JP | 11-89055 | 3/1999 |
| JP | 11-130068 | 5/1999 |
| JP | 11-146537 | 5/1999 |
| JP | 11-167834 | 6/1999 |
| WO | WO 95 01256 A | 1/1995 |

OTHER PUBLICATIONS

Patent Abstracts of Japan, vol. 1999, No. 2, (Feb. 26, 1999) & JP 10 297389 A (Nov. 10, 1998) *abstract*.

* cited by examiner

Primary Examiner—Dhiru R Patel
(74) Attorney, Agent, or Firm—Armstrong, Kratz, Quintos, Hanson & Brooks, LLP

(57) ABSTRACT

A grommet 1 includes a corniced part 2 in a shape of a bellows, and two engaging parts 3, 4 integrally formed on opposite ends of the corniced part and adapted to be engaged with respective bodies to be fitted such as a chassis panel 5 and a door panel 6. The grommet 1 is formed in a hollow tubular shape in such a manner that the corniced part 2 is smaller in diameter than the engaging parts 3, 4. The grommet 1 can be obtained by molding thermoplastic elastomer by injection molding so that the diameter of the engaging parts is less than five times as large as the diameter of the corniced part, opening molds 17, 18 for forming an outer face thereof, and thereafter, enlarging the corniced part thereby removing the grommet from a core 19 for forming an inner face thereof.

3 Claims, 3 Drawing Sheets

GROMMET AND METHOD OF PRODUCING THE SAME

BACKGROUND OF THE INVENTION

1. Field of the Invention

The present invention relates to a grommet, and more particularly to the grommet including a corniced part and engaging parts, and formed in such a manner that the corniced part is smaller in diameter than the engaging parts. The invention also relates to a method of producing the grommet.

2. Description of the Related Art

Recently, so called power window systems have been installed on vehicle doors so that window panels can be easily opened and closed up and down by operating an electric motor provided therefor. The vehicle doors are also provided with speakers, door locks, and so on. Therefore, the electric motor for the power window system and so on must be supplied with power, and wire harnesses are equipped across chassis and the doors.

Usually, each of the wire harnesses is protected by an elastically deformable grommet from water and dust. The grommet includes a corniced part and two engaging parts. The corniced part is formed to have a smaller diameter than the engaging parts which are integrally formed on opposite ends of the corniced part. The engaging parts are adapted to be engaged with a chassis panel and a door panel respectively.

The conventional grommet has been made of rubber which is heavy (its specific gravity is about 1.3), and has badly affected weight reduction of an automobile. Moreover, rubber must be subjected to vulcanizing process which requires lot of working time, and productivity of the grommet has been poor. Further, because rubber is unable to be recycled, effective use of resources has been impossible.

The present invention has been made in view of the above described problems, and it is an object of the invention to provide a grommet which is light weight, able to be recycled, and excellent in productivity, and also a method of producing the grommet.

SUMMARY OF THE INVENTION

In order to solve the above described problems, according to one aspect of the present invention, there is provided a grommet comprising a corniced part in a shape of a bellows, and two engaging parts integrally formed on opposite ends of the corniced part and adapted to be engaged with respective bodies to be fitted, the grommet being formed in a hollow tubular shape in such a manner that the corniced part is smaller in diameter than the engaging parts, wherein the grommet is molded of thermoplastic elastomer by injection molding, and a diameter of the engaging parts is set to be less than five times as large as the diameter of the corniced part.

According to another aspect of the present invention, there is proposed a method of producing a grommet including a corniced part in a shape of a bellows, and two engaging parts integrally formed on opposite ends of the corniced part and adapted to be engaged with respective bodies to be fitted, the grommet being formed in a hollow tubular shape in such a manner that the corniced part is smaller in diameter than the engaging parts, comprising steps of molding thermoplastic elastomer into the grommet by injection molding so that the diameter of the engaging parts is less than five times as large as the diameter of the corniced part, opening molds for forming an outer face thereof, and thereafter, enlarging the corniced part in diameter, thereby removing the grommet from a core for forming an inner face thereof.

According to the first aspect of the present invention, because material for the grommet is thermoplastic elastomer, it is light weight and can be recycled. Moreover, the vulcanizing process will not be required. Meanwhile, since the engaging parts have the diameter which is less than five times as large as the diameter of the corniced part, the grommet can be produced by injection molding. Accordingly, after the molding, the core portion for forming the engaging parts can be passed through the corniced part without difficulty. This will make the molding time shorter, and stabilize dimensional accuracy of an inner face of the grommet.

According to the second aspect of the present invention, there is employed the method of producing the grommet by injection molding of thermoplastic elastomer. Because the thermoplastic elastomer which is similar to rubber in characteristics is employed as material, the grommet thus obtained is light weight. Further, it has become possible not only to recycle the material but to produce the grommet by employing injection molding, resulting in a rapid molding. Still further, dimensional accuracy of the inner face of the grommet will be stabilized, and, of course, vulcanizing process is not required. By molding the grommet by injection molding in such a manner that a ratio in diameter between the engaging parts and the corniced part is less than five, the core portion for forming the engaging parts can be passed through the corniced part without difficulty, after the molding.

DESCRIPTION OF THE PREFERRED EMBODIMENTS

Figure 1:
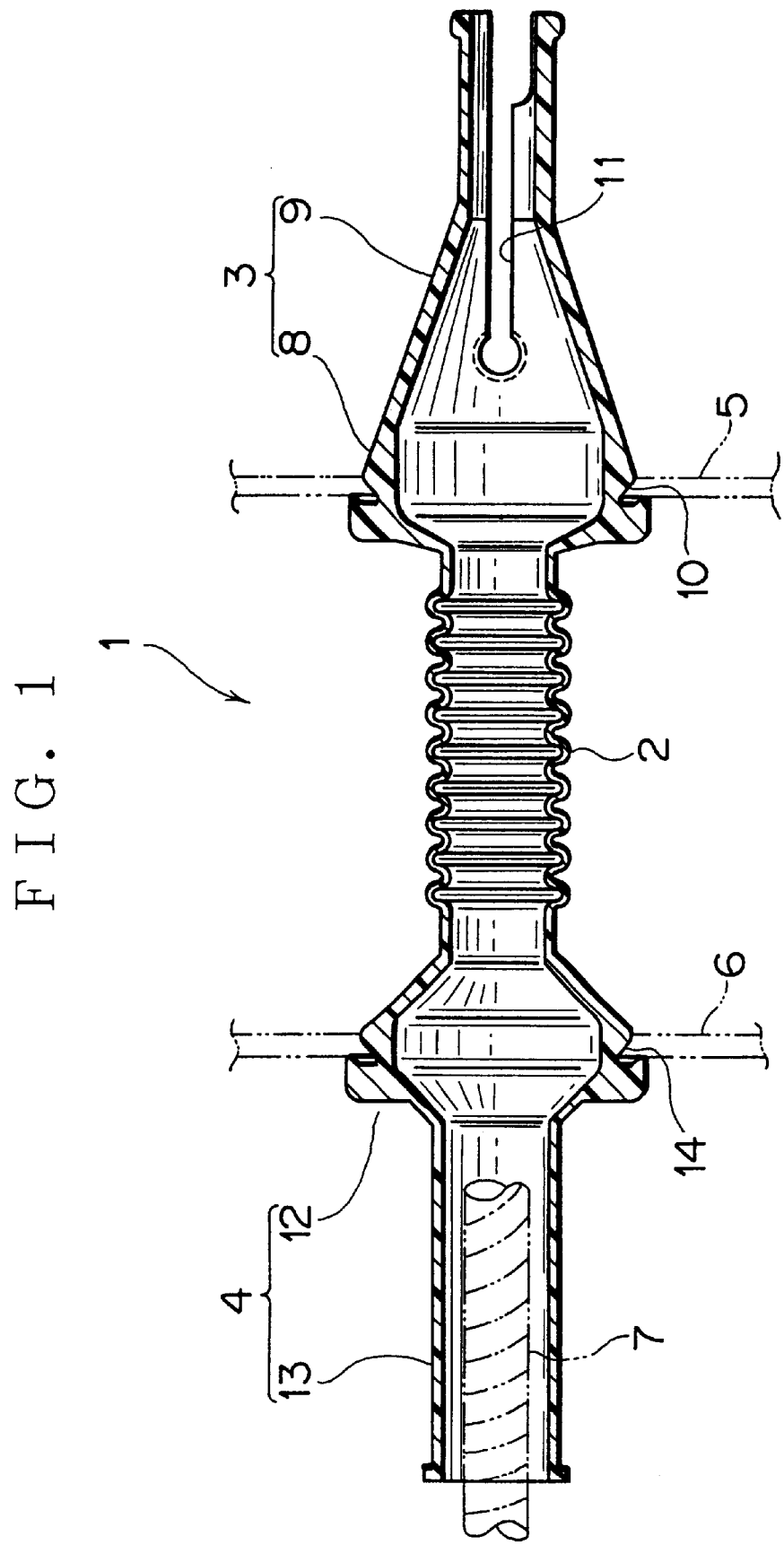
FIG. 1 is a sectional view showing one embodiment of a grommet according to the present invention.

Now, one embodiment of the present invention will be described referring to the drawings.

In FIG. 1, a grommet 1 for a vehicle door is formed of elastomer which has characteristics similar to rubber in flexibility and strength, etc., and is in a hollow tubular shape having a corniced part 2 and two engaging parts 3, 4 at opposite ends of the corniced part 2. The grommet 1 is attached to a chassis panel 5 and a door panel 6 enabling a wire harness 7 arranged therebetween to be protected from water and dust. In short, the wire harness 7 can be protected by the grommet 1. The chassis panel 5 and the door panel 6 constitute bodies to be fitted described in the claims.

Figure 2:
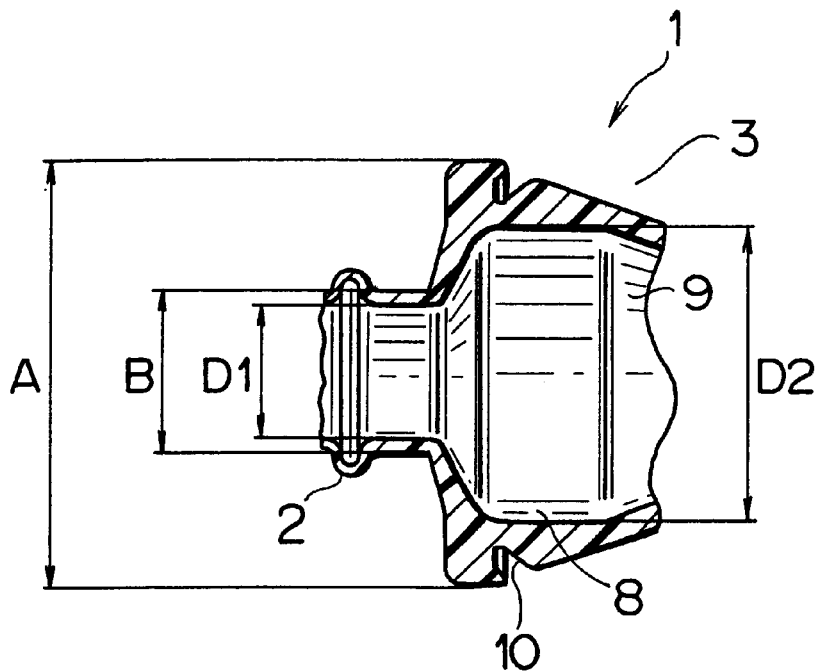
FIG. 2 is a sectional view of essential parts of an engaging part and a corniced part to be engaged with a chassis panel.
Figure 3:
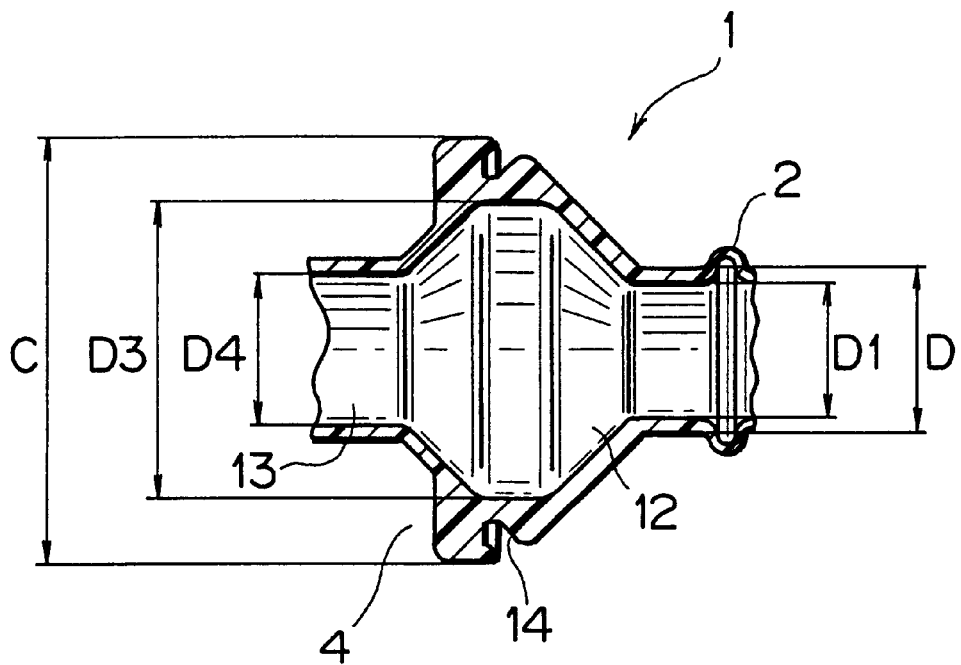
FIG. 3 is a sectional view of essential parts of an engaging part and a corniced part to be engaged with a door panel.

The corniced part 2 is formed in a hollow tubular shape, and the wire harness 7 is adapted to pass through the corniced part 2. Because the corniced part 2 is formed in a bellows shape, the grommet can easily follow opening and closing movements of the vehicle door by expansion and contraction of the corniced part. Opposite end portions of the corniced part 2 are formed in an annular shape having a same inner diameter as threads projecting inwardly in a middle part of the corniced part 2. The engaging parts 3, 4 are integrally continued from the opposite end portions. These opposite end portions are formed rectilinearly. In the present embodiment, the inner diameter of the opposite end portions of the corniced part 2 is D1, as shown in FIGS. 2 and 3. Preferably, the wire harness 7 is held in tight fit inside the corniced part 2.

Referring to FIGS. 1 and 2, the engaging part 3 includes a large diameter tubular portion 8 which is continued from the corniced part 2 and adapted to be engaged with a hole in the chassis panel 5 which is not shown, and a funnel shaped tubular portion 9 which is in a substantially funnel shape in cross section and continued from the large diameter tubular portion 8 inside of the chassis panel 5. The engaging part 3 is so designed as to guide out the wire harness 7 to the chassis side. The large diameter tubular portion 8 has an inner diameter D2 which is larger than the inner diameter D1 of the corniced part 2 (D2>D1). The large diameter tubular portion 8 is provided with an annular groove 10 around its outer circumference to be engaged with the above mentioned hole in the chassis panel 5. The funnel shaped tubular portion 9 is provided with a slit 11.

Referring to FIGS. 1 and 3, the engaging part 4 includes a large diameter tubular portion 12 which is continued from the corniced part 2 and adapted to be engaged with a hole in the door panel 6 which is not shown, and a small diameter tubular portion 13 which is smaller in diameter than the large diameter tubular portion 12 and extends rectilinearly. The large diameter tubular portion 12 has an inner diameter D3 which is larger than the inner diameter D1 of the corniced part 2 (D3>D1), and is provided with an annular groove 14 around its outer circumference to be engaged with the above mentioned hole in the door panel 6. It is to be noted that the large diameter tubular portion 12 is formed in such a manner that the inner diameter D3 is less than five times as large as the inner diameter D1 of the corniced part 2 for convenience of molding. In the present embodiment, the inner diameter D3 is equal to the inner diameter D2. An inner diameter D4 of the small diameter tubular portion 13 is set to be slightly larger than the inner diameter D1 of the corniced part 2 and adequately smaller than the inner diameter D3.

Figure 4:
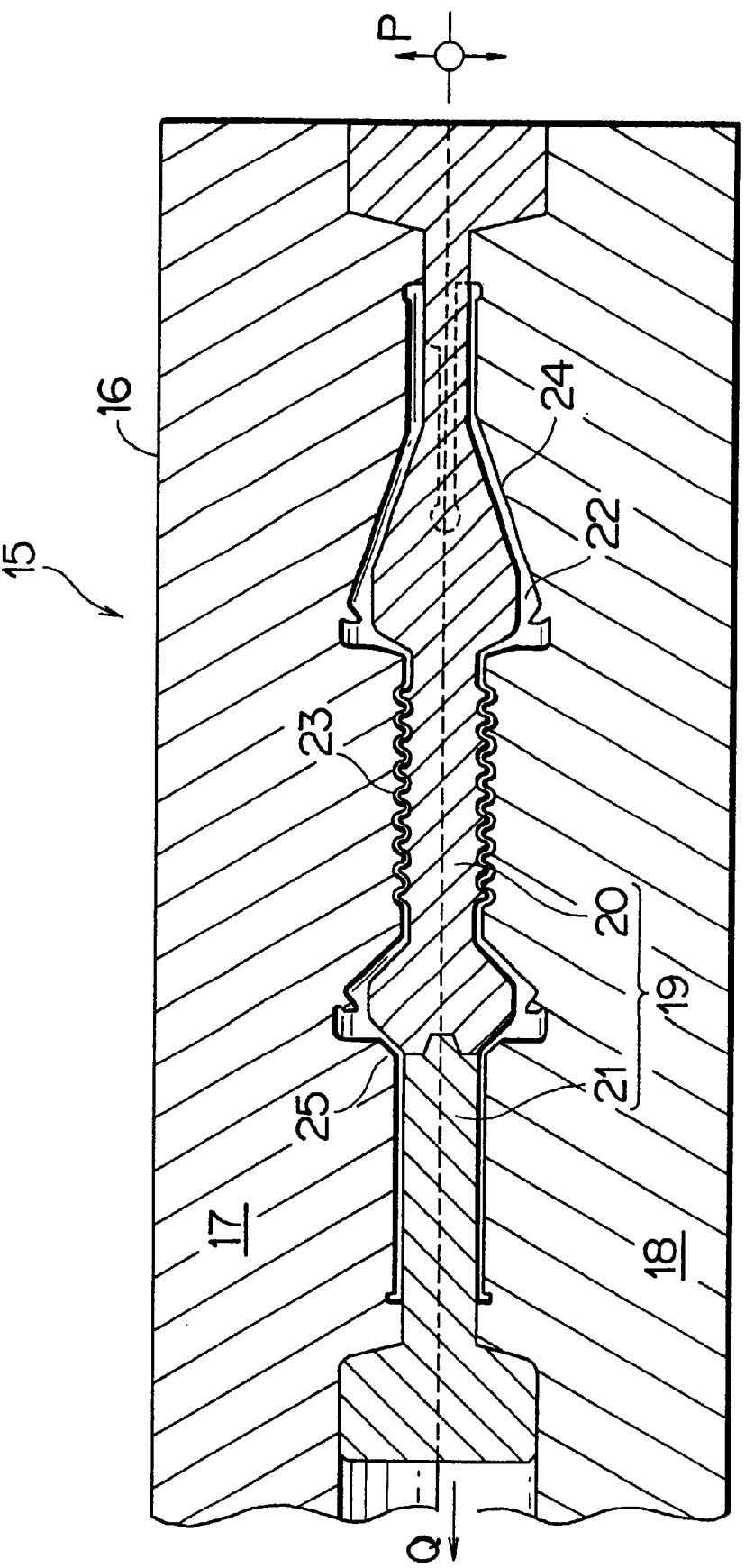
FIG. 4 is a schematic view of a metal mold for explaining molding process of the grommet.

The grommet 1 having the above described structure is formed by injection molding by means of a metal mold 15 as shown in FIG. 4. The metal mold 15 has at least one cavity part 16 which is composed of molds 17, 18 and a core 19. The molds 17, 18 are adapted to form an outer face of the grommet 1, while the core 19 is adapted to form an inner face of the grommet 1. The core 19 consists of a fixed part 20 and a movable part 21.

When the metal mold 15 is tightened, a molding cavity 22 is formed in the cavity part 16, into which molten elastomer (thermoplastic elastomer) is injected. After the injection molding, the molds 17, 18 are opened in directions of arrows P, and the movable part 21 of the core 19 slides in a direction of an arrow Q. On the fixed part 20 of the core 19, there remains the grommet 1 which has been thus molded. Then, the grommet 1 is air blown from inside of the corniced part 2 (the corniced part 2 is inflated by means of an air inflator) to enlarge the inner diameter of the corniced part 2. Thus, the grommet 1 as shown in FIG. 1 can be obtained by removing it from the fixed part 20 in the direction of the arrow Q.

In FIG. 4, an area 23 contributes to forming of the corniced part 2, and areas 24, 25 contribute to forming of the engaging parts 3, 4 respectively.

The grommet 1 which has been formed through the above described molding process has been subjected to following tests according to a permanent extension test prescribed in JIS K 6301. Rabaron (black) (trade name) was employed as the thermoplastic elastomer.

(1) Initial dimensions of the grommet have been measured at the following four points A–D.

A: outer diameter of the large diameter tubular portion 8 of the engaging part 3 (See FIG. 2).

B: outer diameter of the end portion of the corniced part 2 adjacent to the engaging part 3 (See FIG. 2).

C: outer diameter of the large diameter tubular portion 12 of the engaging part 4 (See FIG. 3).

D: outer diameter of the end portion of the corniced part 2 adjacent to the engaging part 4 (See FIG. 3).

The value at the point A was 50.1 mm, the value at the point B was 19.9 mm, the value at the point C is 50.0 mm, and the value at the point D is 20.1 mm (averages of n=4). Thickness of the corniced part 2 is 1.50 mm on the drawings.

(2) The grommet 1 is mounted on an opening/closing device (not shown), and opened at respective opening/closing rates to be kept open for 10 minutes.

(3) The grommet 1 is detached from the opening/closing device and left to stand for 10 minutes.

(4) The grommet 1 is measured again at the following four points A–D after it has been left to stand.

(5) After the tests, a sample is inserted into a simulation panel (not shown) to confirm that there is no problem.

After the above tests, a crack has been created around a circular part in the depth of the slit 11 but not in the corniced part 2, in case where the opening/closing rate was 500%. Insertion into the simulation panel can be conducted without problem. As the results, it has been found that if the inner diameters D2 and D3 of the large diameter tubular portion 8 and the large diameter tubular portion 12 are set to be less than five times as large as the inner diameter D1 of the bellow part 2, the grommet 1 free from any problem can be obtained.

As described above, the grommet 1 according to the present invention has such effects that it is light weight and can be recycled. Further, since the vulcanizing process is not required, productivity will be enhanced. Still further, because the grommet is produced by injection molding, the molding process can be conducted much faster and the productivity can be enhanced the more. Needless to say, dimensional accuracy of the inner face of the grommet 1 can be stabilized thereby contributing to improvement of the productivity.

It is apparent that various modifications can be made in the present invention within a scope not deviating from a gist of the invention. For example, the present invention can be applied to such a grommet as provided with only one engaging part.

As the thermoplastic elastomer, olefin elastomer can be also employed besides the above mentioned rabaron (black) which is stylene elastomer.

What is claimed is:

1. A grommet comprising;

a corniced part in a shape of a bellows; and two engaging parts integrally formed on opposite ends of said corniced part and adapted to be engaged with respective bodies to be fitted, said grommet being formed in a hollow tubular shape in such a manner that said corniced part is smaller in an inner diameter than said engaging parts, wherein said grommet is molded of thermoplastic elastomer by injection molding, and an inner diameter of said engaging parts is within a range between one-and-one-half times and five times as large as the inner diameter of said corniced part.

2. A method of producing a grommet including a corniced part in a shape of a bellows, and two engaging parts integrally formed on opposite ends of said corniced part and adapted to be engaged with respective bodies to be fitted, said grommet being formed in a hollow tubular shape in such a manner that said corniced part is smaller in an inner diameter than said engaging parts, comprising steps of:

molding thermoplastic elastomer into said grommet by injection molding so that an inner diameter of said engaging parts is within a range between one-and-one-half times and five times as large as the inner diameter of said corniced part, opening molds for forming an outer face thereof, and thereafter, enlarging said corniced part in diameter thereby removing said grommet from a core for forming an inner face thereof.

3. A method of producing a grommet including a corniced part in a shape of a bellows, and two engaging parts integrally formed on opposite ends of said corniced part and adapted to be engaged with respective bodies to be fitted, said grommet being formed in a hollow tubular shape in such a manner that said corniced part is smaller in an inner diameter than said engaging parts, comprising steps of:

molding thermoplastic elastomer into said grommet by injection molding so that an inner diameter of said engaging parts is less than five times as large as the inner diameter of said corniced part, opening molds for forming an outer face thereof, sliding a slide part of a core so as to be apart from a fixed part of said core and holding said grommet molded in said molds at said fixed part of said core, blowing air into an inside of said corniced part to enlarge the inner diameter of said corniced part, and removing said grommet from said fixed part of said core.

* * * * *